US012146339B1

(12) United States Patent
Francisco

(10) Patent No.: US 12,146,339 B1
(45) Date of Patent: Nov. 19, 2024

(54) UNDERWATER SHEATH DEVICE AND METHOD FOR INSTALLATION

(71) Applicant: Mike Francisco, Island Lake, IL (US)

(72) Inventor: Mike Francisco, Island Lake, IL (US)

( * ) Notice: Subject to any disclaimer, the term of this patent is extended or adjusted under 35 U.S.C. 154(b) by 0 days.

(21) Appl. No.: 18/157,064

(22) Filed: Jan. 19, 2023

Related U.S. Application Data

(60) Provisional application No. 63/301,045, filed on Jan. 19, 2022.

(51) Int. Cl.
*E04H 4/14* (2006.01)
*F21V 31/00* (2006.01)
*F21W 131/401* (2006.01)

(52) U.S. Cl.
CPC ........... *E04H 4/148* (2013.01); *F21V 31/005* (2013.01); *F21W 2131/401* (2013.01)

(58) Field of Classification Search
CPC .. E04H 4/148; F21V 31/005; F21W 2131/401
See application file for complete search history.

(56) References Cited

U.S. PATENT DOCUMENTS 4,293,138 A * 10/1981 Swantee ............... F16L 17/025 285/345
4,543,623 A * 9/1985 Ehret .................... F21V 31/005 362/306
4,613,169 A * 9/1986 Engelhart ............... F16L 41/14 277/606
5,850,640 A * 12/1998 Pinciaro ............. A61H 33/6063 285/139.2
6,453,484 B1 * 9/2002 Pinciaro .................... F16L 5/10 4/541.6
8,262,094 B2 * 9/2012 Beele ........................ F16L 5/10 277/630
10,938,245 B1 * 3/2021 Sanson ................... F21V 23/06
2003/0209359 A1 * 11/2003 Baker .................... H02G 3/088 174/653
2006/0087114 A1 * 4/2006 Yeager ...................... F16L 5/02 285/230
2007/0097667 A1 5/2007 Armstrong et al.
2011/0089645 A1 * 4/2011 White ...................... F16J 15/02 277/637

* cited by examiner

*Primary Examiner* — Tsion Tumebo
(74) *Attorney, Agent, or Firm* — Allison M. Corder

(57) ABSTRACT

An underwater light sheath device and method for installation for preventing water from leaking out of bodies of water—pools and spas—through a niche housing such as that caused by a broken conduit opening. The sheath device is located over the conduit opening of a niche housing and designed to provide a water-tight seal over a conduit opening of a niche housing. An electrical cord of the light fixture is positioned through the sheath device and conduit opening of the niche housing.

11 Claims, 4 Drawing Sheets

SECTION A - A

UNDERWATER SHEATH DEVICE AND METHOD FOR INSTALLATION

REFERENCE TO RELATED APPLICATIONS

This application claims the benefit of U.S. Provisional Application No. 63/301,045 filed Jan. 19, 2022.

FIELD OF THE INVENTION

The invention relates to underwater lights such as those used in bodies of water such as pools and water spas including hot tubs. More specifically, the present invention relates to a sheath device for an underwater light that includes a niche housing.

BACKGROUND OF THE INVENTION

A swimming pool, or simply pool, and water spa are structures such as a tank or basin designed to hold water to enable swimming or other activities. Many pools and spas have underwater lights for night swimming or aesthetics. Most underwater lights are installed within a niche housing, otherwise referred to as a "niche". Niches are typically installed during construction of a pool. A light fixture including electrical wire, or cord, is placed within the niche. The cord is routed through a conduit opening in the niche. The cord connects the light fixture to a junction box.

Typically, these light fixtures and niches break with time causing leaks of water from the pool. Broken niches, which also include damaged or degraded niches, can be caused by ground movement, freezing conditions, bad glue joints or bad solder joints. For example, a conduit opening of a niche-specifically, the male thread adapter of the conduit opening—may break or get damaged causing water to leak from the pool. Current methods known to fix broken conduits include pool putty and split plugs.

Pool putty or any other submersible caulk or putty may be applied either under water or out of water. The putty is pushed around the cord and into the conduit opening. After the putty cures, the light fixture can be re-installed. But a problem with this fix is that any movement of the electrical wire can move causing the putty to separate from the cord leaving a path for water to get through the conduit.

A split plug is a rubber tapered plug that has a hole through the center and is then cut down one side allowing the light cord to be inserted into the center of the plug. After it is inserted, it is then pushed into the conduit opening of the niche housing. Split plugs fail because they cannot be positioned deep enough within the conduit. Any movement of the light fixture after the light fixture is re-installed into the niche may cause the split plug to fall out of the conduit opening. This permits water to enter the conduit line.

Another problem is that the electrical cord may become deteriorated or damaged by the conduit opening or male thread adapter either over time or from movement of the cord within the niche housing. This may cause electrical problems.

What is needed is a device to prevent or repair water leaks in a pool or spa, and specifically leaks that occur through a conduit opening of an underwater niche housing as well as a device that preserves and protects the electrical cord from damage and deterioration. The invention satisfies this need.

BRIEF SUMMARY OF THE INVENTION

The underwater light sheath device and method for installation according to the invention prevents water from leaking out of bodies of water-pools and spas-through a niche housing such as that caused by a broken conduit opening, for example, a broken male thread adapter. The sheath device is located over the conduit opening of a niche housing and prevents exposure to water. The sheath device is designed to provide a water-tight seal over a conduit opening of a niche housing. The sheath device also preserves and protects the electrical cord from damage and deterioration caused by movement of the cord within the conduit opening.

The device includes a body component extending from a first end to a second end and comprising three portions. A base portion, a corrugated portion, and a support portion. The base portion includes an aperture and elements for attaching the sheath device to the niche housing. The corrugated portion includes a plurality of alternating ridges and grooves making it flexible.

This is desired so that the sheath device may bend and move, e.g., with movement of the electrical cord. The support portion includes an aperture with a circumference that provides a tight fit-pressed fit, interference fit, friction fit-between the sheath device and electrical cord. This prevents water from entering the sheath device and into the conduit opening of a niche housing. The sheath device is permanently attached to the niche housing using any adhesive, resin, epoxy. One that is water resistant, or waterproof is preferred.

The device is made of any flexible material that does not harden. It is desirable also that the device be made of a corrosive resistant material. The device may be constructed from chemical resistant rubber with high tear strength. One particular type of chemical resistant rubber contemplated is ethylene propylene diene terpolymer (EPDM). When installed, the device maintains its flexibility so when the light fixture is installed the cord can bend with the device.

Advantages of the invention include the prevention of water loss that may result in lower water usage (and cost). Preventing water loss may also prevent pool or spa covers from damage—water loss may cause a cover to sag and ruin it. The invention may also prevent ground erosion caused by the water leakage—no more cracked concrete pool decks. With the invention, there is no need for repeated repairs (and costs) such as with pool putty or split plugs.

The invention and its attributes and advantages will be further understood and appreciated with reference to the accompanying drawings.

BRIEF DESCRIPTION OF THE FIGURES

The preferred embodiments of the invention are described in conjunction with the attached figures that illustrate embodiments of the invention.

DETAILED DESCRIPTION OF THE INVENTION

Figure 1:
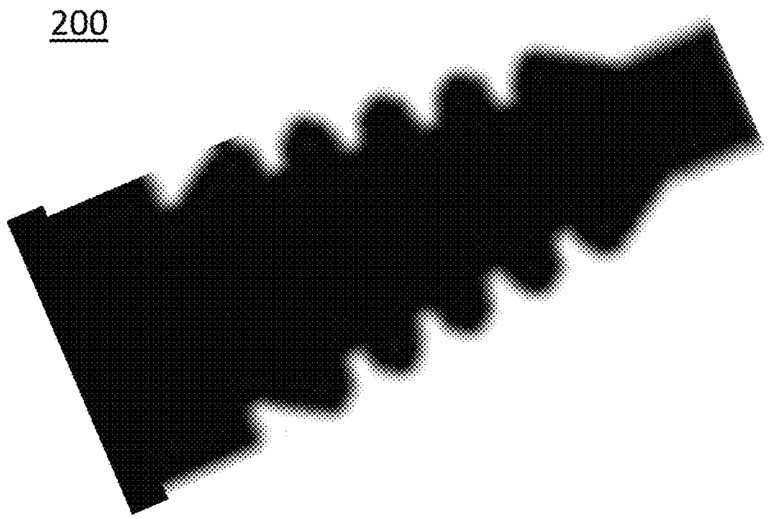
FIG. 1 illustrates an isometric view of an underwater light sheath device according to the invention.
Figure 2:
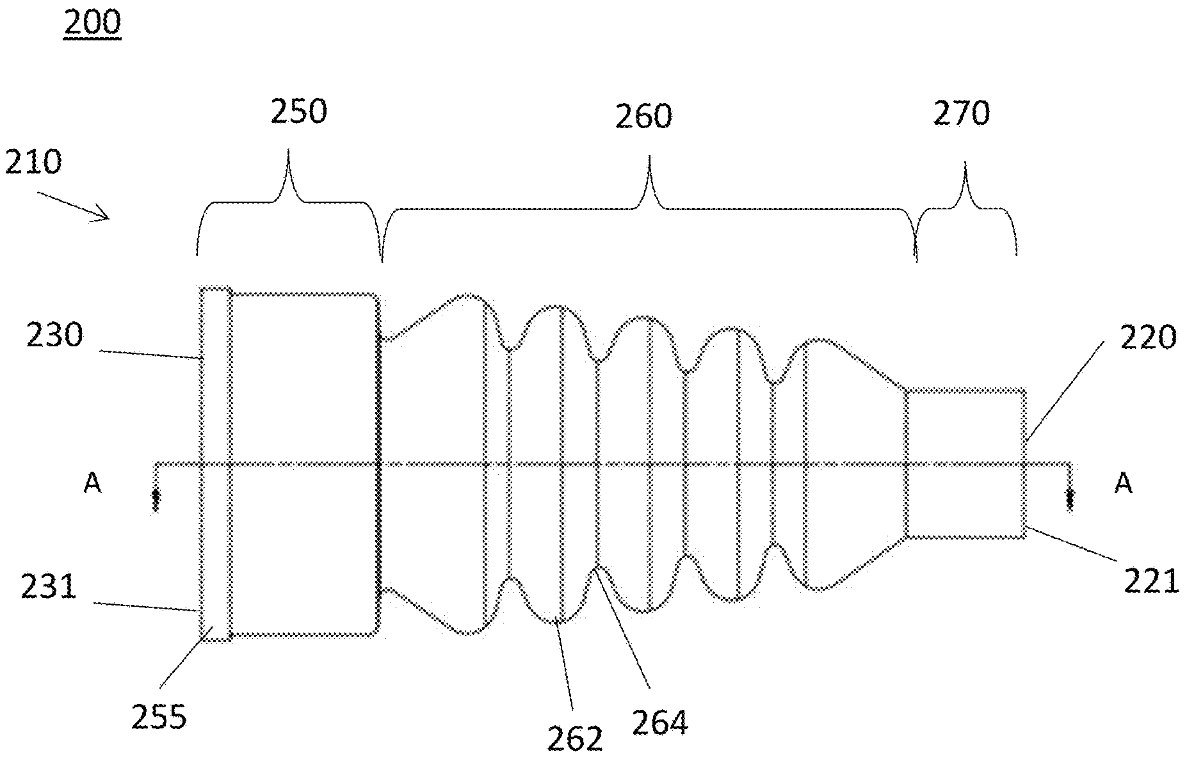
FIG. 2 illustrates a side view of an underwater light sheath device according to the invention.
Figure 3:
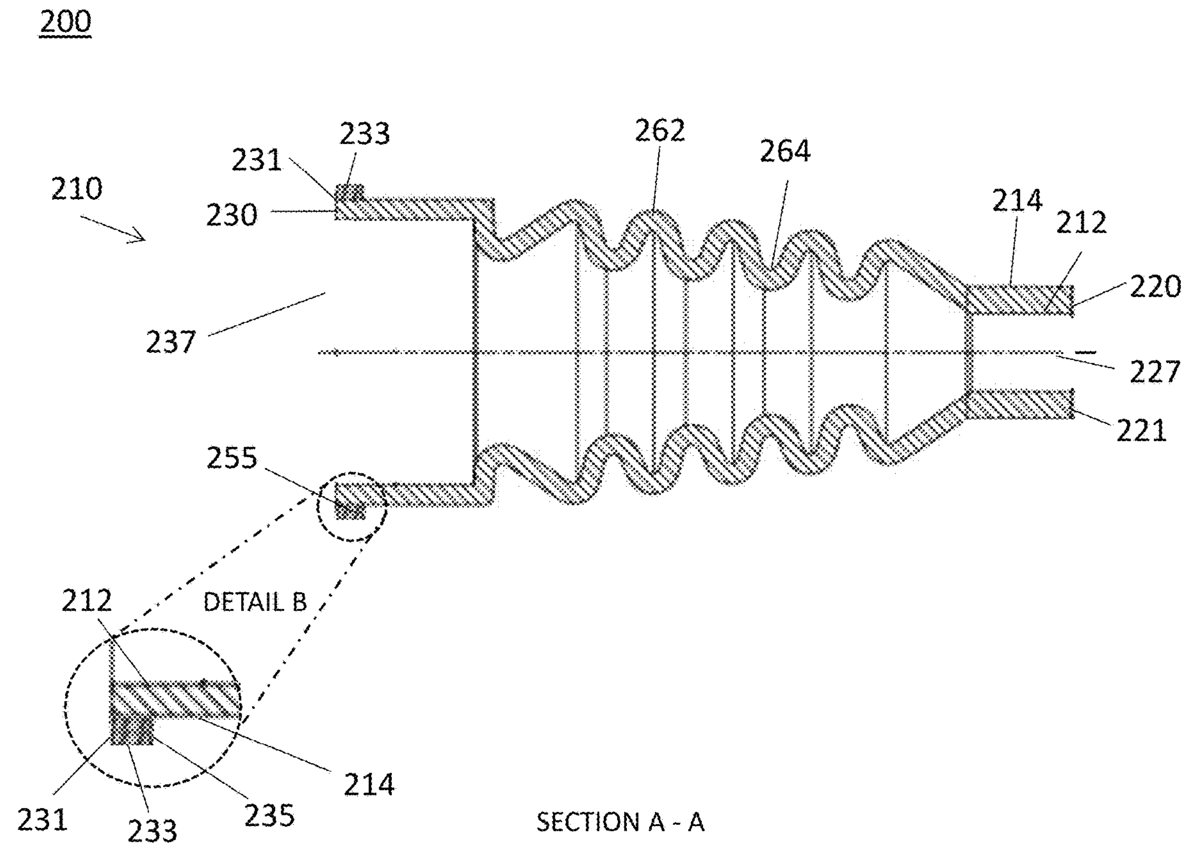
FIG. 3 illustrates a section side view of an underwater light sheath device according to the invention.
Figure 4A:
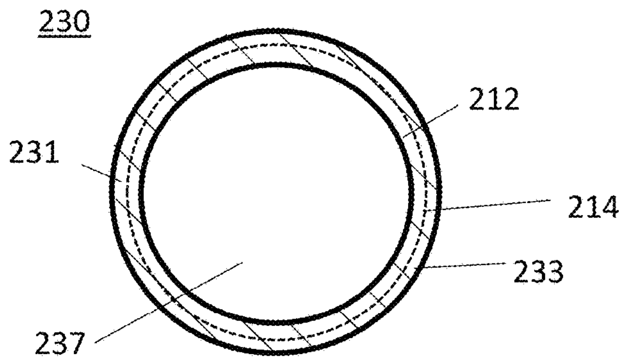
FIG. 4A illustrates a first end view of an underwater light sheath device according to the invention.
Figure 4B:
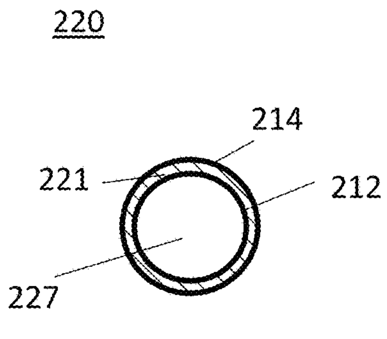
FIG. 4B illustrates a second end view of an underwater light sheath device according to the invention.

As shown in FIGS. 1-4B, the underwater light sheath device 200 comprises a body component 210 and two opposing ends 220, 230.

Sheath device 200 includes a body component 210 that extends from a first end 220 to a second end 230. The body component 210 includes an inside surface 212 and an outside surface 214. The inside surface 212 defines a first aperture 227 at the first end 220 and a second aperture 237 at a second end 230. A first diameter of the first aperture 227 is smaller than a second diameter of the second aperture 237. The first end 220 includes a top surface 221 and the second end 230 includes a bottom surface 231.

The body component 210 consists of three portions: a base portion 250, a corrugated portion 260, and a support portion 270. The base portion 250 includes a platform element 255. Platform element 255 is defined by a portion of the bottom surface 231, a side surface 233, and an upper surface 235 forming a thin, annular-shaped protrusion about the circumference of the second end 230. The platform element 255 provides additional surface area on which an adhesive, such as a resin or epoxy, is deposited. Adhesive is deposited so that it covers the platform element 255 and surrounding surface of the niche housing.

The corrugated portion 260 comprises a plurality of alternating ridges 262 and grooves 264. Each ridge 262 and each groove 264 is defined by a circumference of a portion of the body component 210. As shown in the embodiment of the figures, the body component 210 comprises five ridges 262 and four grooves 264. The ridges 262 and the grooves 264 are tapered from the second end 230 to the first end 220, i.e., the diameters defined by the circumference of each ridge 262 and each groove 264 gradually decrease in measurement from the second end 230 to the first end 220. The greater the measurement of the ridges 262 and grooves 264, the greater the flexibility of the body component. Thus, the tapered arrangement provides greater flexibility of the body component 210 near the base portion 250 than near the support portion 270.

Figure 5:
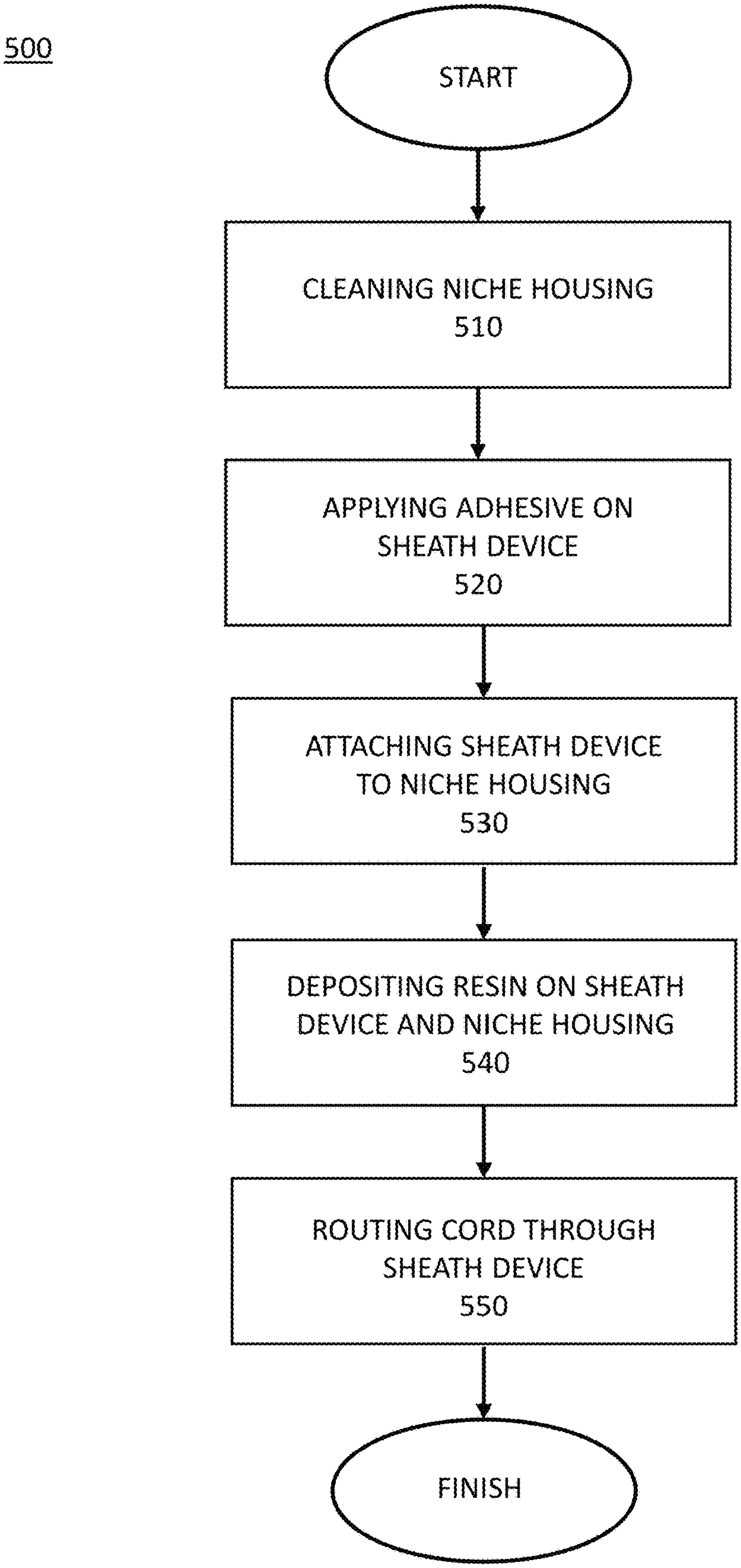
FIG. 5 is a flow chart of a method for installation of the underwater light sheath device.

FIG. 5 is a flow chart of a method for installation of the underwater light sheath device. At step 510, the surface of the niche housing is cleaned from water and debris. At step 520, adhesive such as glue is applied to a bottom surface of the sheath device. Then, at step 530, the bottom surface of the sheath device is attached to the niche surface to cover the conduit opening of the niche housing. A resin is deposited on both the sheath device and niche surface at step 540. Specifically, the resin is applied to a platform element and nearby surrounding surface of the niche housing. Finally, at step 550, an electrical cord is routed through the sheath device from the first aperture 227 of the first end 220 through the second aperture 237 of the second end 230. The electrical cord extends beyond the second end 230 and through a conduit opening of the niche housing to a junction box.

Figure 6A:
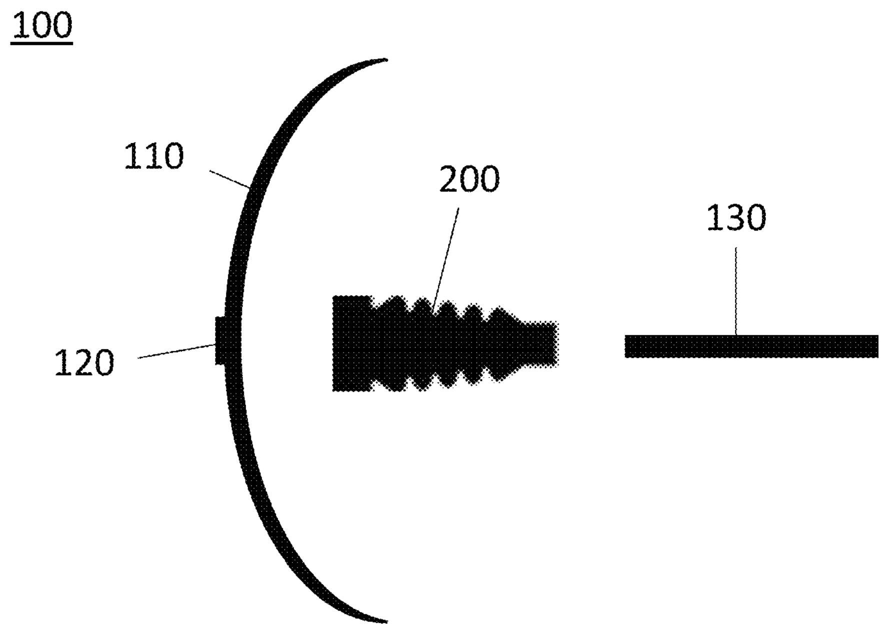
FIG. 6A illustrates an exploded side view of an installation of the underwater light sheath device.
Figure 6B:
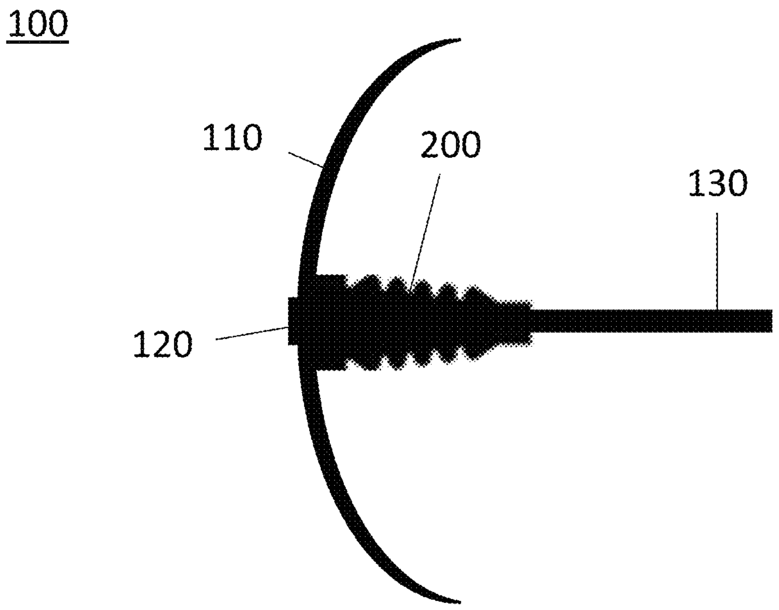
FIG. 6B illustrates an assembled side view of the installation of the underwater light sheath device.

The method to install the sheath device may be used any time a new underwater light is installed or repaired. The sheath device may be installed with no water in the niche housing. This is either at the time of a new pool installation or after water is drained from the pool, i.e., to at least the bottom of the niche housing. FIG. 6A illustrates an exploded side view of an installation of the underwater light sheath device and FIG. 6B illustrates an assembled side view of the installation of the underwater light sheath device.

Niche housing 110 includes conduit opening 120 with male thread adapter. Sheath device 200 is attached to the niche surface using an adhesive as detailed above. The first diameter of the first aperture is smaller than a second diameter of the second aperture. The first aperture is configured to receive an electrical cord. The second aperture is configured to be positioned over the conduit opening of the niche housing. A quick-drying resin is deposited on both the sheath device and niche surface to provide a permanent attachment between the sheath device and niche housing. Specifically, the resin is applied to a platform element and nearby surrounding surface of the niche housing. An electrical cord 130 is routed through the first aperture of the sheath device. It is contemplated that a lubricant may be used on the electrical cord to assist with inserting it into the first aperture. The electrical cord and inside surface of the first aperture form a tight fit-pressed fit, interference fit, friction fit—to prevent water from entering into the sheath device.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. An underwater light sheath device for attaching to a surface of a niche housing and external to a conduit opening in the niche housing, the device comprising:

a body component extending from a first end to a second end, the body component including an inside surface and an outside surface, the inside surface defines a first aperture at the first end and a second aperture at the second end, the first end further comprises a top surface and the second end further comprises a bottom surface, the sheath device external to the conduit opening and not inserted within the conduit opening, the bottom surface of the second end configured to attach to the surface of the niche housing so that both the inside surface and the outside surface of the body component are external to the conduit opening, an electrical cord configured to emerge out from the conduit opening of the niche housing and pass through the body component of the device, and the body component includes a base portion, a corrugated portion, and a support portion.

2. The underwater light sheath device of claim 1, wherein the base portion includes a platform element defined by a portion of the bottom surface, a side surface, and an upper surface forming a thin, annular-shaped protrusion about the circumference of the second end.

3. The underwater light sheath device of claim 1, wherein the corrugated portion comprises a plurality of alternating ridges and grooves.

4. The underwater light sheath device of claim 3, wherein the body component comprises five ridges and four grooves.

5. The underwater light sheath device of claim 3, wherein the ridges and the grooves are tapered from the second end to the first end.

6. The underwater light sheath device of claim 1, wherein the body component is fabricated from ethylene propylene diene terpolymer (EPDM).

7. A method for repairing an underwater light comprising a niche housing and an electrical cord, the method comprising the steps of:

cleaning a surface of the niche housing, applying an adhesive to a bottom surface of a sheath device, attaching the bottom surface of the sheath device to the surface of the niche housing, the sheath device configured to be not inserted within the conduit opening, wherein both the inside surface and the outside surface of the body component are external to the conduit opening, depositing a resin on both the surface of the niche housing and a platform element of the sheath device.

8. The method for repairing an underwater light according to claim 7, the method further comprising the step of routing the electrical cord through a first aperture of a first end of the sheath device.

9. The method for repairing an underwater light according to claim 7, wherein the sheath device comprises:

a body component extending from a first end to a second end, the body component including an inside surface and an outside surface, the inside surface defines a first aperture at the first end and a second aperture at the second end, the first end further comprises a top surface and the second end further comprises a bottom surface, and the body component includes a base portion, a corrugated portion and a support portion, wherein the base portion includes a platform element defined by a portion of the bottom surface, a side surface, and an upper surface forming a thin, annular-shaped protrusion about the circumference of the second end, wherein the corrugated portion comprises a plurality of alternating ridges and grooves, each ridge and groove defined by a circumference of a portion of the body component, the ridges and the grooves are tapered from the second end to the first end.

10. The method for repairing an underwater light according to claim 7, wherein the body component is fabricated from ethylene propylene diene terpolymer (EPDM).

11. An underwater light sheath device for attaching over a conduit opening in a niche housing, the device comprising:

a body component extending from a first end to a second end, the body component including an inside surface and an outside surface, the inside surface defines a first aperture at the first end and a second aperture at the second end, the first end further comprises a top surface and the second end further comprises a bottom surface, the body component includes a base portion, a corrugated portion, and a support portion, the base portion includes a platform element defined by a portion of the bottom surface, a side surface, and an upper surface forming a thin, annular-shaped protrusion about the circumference of the second end, the corrugated portion comprises a plurality of alternating ridges and grooves, each ridge and groove defined by a circumference of a portion of the body component, the ridges and the grooves are tapered from the second end to the first end, and the platform element of the sheath device attachable to the surface of the niche housing, the sheath device not inserted within the conduit opening and positioned external to the conduit opening, so that an electrical cord passing out of the conduit opening of the niche housing passes through the second end of the device, the body component of the device, and the first end of the device.

* * * * *